US008910127B2

United States Patent
Judelman et al.

(10) Patent No.: US 8,910,127 B2
(45) Date of Patent: Dec. 9, 2014

(54) ESTIMATING INDIRECT INTERFACE IMPLEMENTATION BEFORE LOAD TIME BASED ON DIRECTLY IMPLEMENTED METHODS

(71) Applicant: Identify Software Ltd. (IL), Petach Tikva (IL)

(72) Inventors: Shiri Semo Judelman, Kfar-Saba (IL); Asaf Dafner, Gedera (IL); Eyal Koren, Dafna (IL)

(73) Assignee: Identify Software Ltd. (IL), Peteach Tikva (IL)

( * ) Notice: Subject to any disclaimer, the term of this patent is extended or adjusted under 35 U.S.C. 154(b) by 99 days.

(21) Appl. No.: 13/623,593

(22) Filed: Sep. 20, 2012

(65) Prior Publication Data

US 2014/0082596 A1    Mar. 20, 2014

(51) Int. Cl.
*G06F 9/445*    (2006.01)
*G06F 9/44*    (2006.01)
*G06F 9/00*    (2006.01)

(52) U.S. Cl.
CPC ... *G06F 9/00* (2013.01); *G06F 8/61* (2013.01)
USPC ........... 717/130; 717/162; 717/165; 717/167; 719/332

(58) Field of Classification Search
None
See application file for complete search history.

(56) References Cited

U.S. PATENT DOCUMENTS

| | | | | |
|---|---|---|---|---|
| 5,907,707 A * | 5/1999 | Ramalingam et al. | ........ | 717/104 |
| 6,546,551 B1 * | 4/2003 | Sweeney et al. | ............. | 717/154 |
| 6,651,248 B1 * | 11/2003 | Alpern | .......... | 717/162 |
| 6,877,163 B1 * | 4/2005 | Jones et al. | ................ | 719/332 |
| 7,430,734 B2 * | 9/2008 | Sollich | ........ | 717/166 |
| 7,478,409 B2 * | 1/2009 | Scian et al. | ................ | 719/328 |
| 8,082,542 B2 * | 12/2011 | Bottomley et al. | .......... | 717/148 |
| 8,276,125 B2 * | 9/2012 | Fan et al. | ..................... | 717/130 |
| 8,464,225 B2 * | 6/2013 | Greifeneder | ................. | 717/130 |
| 2004/0015936 A1 * | 1/2004 | Susarla et al. | ............... | 717/166 |
| 2009/0144714 A1 * | 6/2009 | Fan et al. | ..................... | 717/166 |
| 2011/0131033 A1 * | 6/2011 | Ylonen | ......................... | 704/9 |

OTHER PUBLICATIONS

Hagen, "Java: Understanding Generics, Type Erasure, and Bridge Methods", Jun. 24, 2011, p. 1-5.*

* cited by examiner

*Primary Examiner* — Don Wong
*Assistant Examiner* — Devayani R Talukdar
(74) *Attorney, Agent, or Firm* — Brake Hughes Bellermann LLP

(57) ABSTRACT

According to an example implementation, a computer-readable storage medium, computer-implemented method and a system are provided to receive a first class, the first class indirectly implementing a first interface, wherein the first class extends a second class that directly implements the first interface, identify one or more directly implemented methods within the first class, determine a method signature for one or more of the directly implemented methods, estimate that the first class indirectly implements the first interface based on the method signatures for the one or more directly implemented methods, and instrument the first class based on the estimating that the first class indirectly implements the first interface.

20 Claims, 7 Drawing Sheets

```
                    510
public interface DatabaseI {    512
    public void establishConnection(String url, Properties info);

public ResultSet executeQuery(String sql);
            516                      514
    public void commit();
            518
    public void rollback();
            520
    public void close();
}
```

```
                              610
                              /
public class DefaultDBImpl implements DatabaseI {
    public void establishConnection(String url, Properties
info) {                       611
        // Default logic for establishing a connection
    }
                                            612
                    614
                    /
    public ResultSet executeQuery(String sql) {
        // Default logic for executing a query
    }
                616
                /
    public void commit() {
        // Default logic for finalizing a query
    }
                618
                /
    public void rollback() {
        // Default implementation for undoing a change
    }
                620
                /
    public void close() {
        // Default implementation for closing a connection
    }
}
```

```
                    710
public class ZippedDBImpl extends DefaultDBImpl {
                      712
    public ResultSet executeQuery(String sql) {
        // Implements specific logic for zipped DB
    }
                 714
    public void close() {
        // Implements specific logic for closing a zipped DB
connection
    }
                                716
    public void establishConnection(String url, Properties info) {
        // Implements specific logic for opening a zipped DB
connection
    }
}
```

ESTIMATING INDIRECT INTERFACE IMPLEMENTATION BEFORE LOAD TIME BASED ON DIRECTLY IMPLEMENTED METHODS

TECHNICAL FIELD

This description relates to class files, and in particular to estimating indirect interface implementation before load time based on directly implemented methods.

BACKGROUND

Each Java class (or class file) includes byte-code that may be executed by a Java Virtual Machine (JVM). Each class may include a declaration or statement indicating that the class implements an interface. An interface defines the method names and parameters for a set of methods that make up the interface. Also, each method may have a method signature. As an example, a method signature may include a method name and a number, type and/or order of the method's parameters. A first class may extend a second class. However, the details of the second class are not typically apparent from an inspection of the first class.

SUMMARY

According to an example implementation, a non-transitory computer-readable storage medium is provided that includes computer-readable instructions stored thereon that, when executed, are configured to cause a processor to at least receive a first class, the first class indirectly implementing a first interface, wherein the first class extends a second class that directly implements the first interface, identify one or more directly implemented methods within the first class, determine a method signature for one or more of the directly implemented methods, estimate that the first class indirectly implements the first interface based on the method signatures for the one or more directly implemented methods, and instrument the first class based on the estimating that the first class indirectly implements the first interface.

According to another example implementation, a computer implemented method is provided. The method includes receiving a first class, the first class indirectly implementing a first interface, wherein the first class extends a second class that directly implements the first interface, identifying one or more directly implemented methods within the first class, determining a method signature for one or more of the directly implemented methods, estimating that the first class indirectly implements the first interface based on the method signatures for the one or more directly implemented methods, and instrumenting the first class based on the estimating that the first class indirectly implements the first interface.

According to another example implementation, a computer implemented method is provided. The method includes determining a method signature for each of a plurality of interface methods, assigning a weight to each of the plurality of interface method signatures based on a number of occurrences of the associated interface method signature within a group of classes and interfaces, receiving a first class, the first class indirectly implementing a first interface, wherein the first class extends a second class that directly implements the first interface, identifying one or more methods that are directly implemented within the first class, determining a method signature for each of the one or more directly implemented methods within the first class, comparing the method signature for the one or more directly implemented methods to the method signatures of the interface methods, identifying one or more of the directly implemented methods having a method signature that matches one of the interface method signatures, determining a class score for the first class with respect to the first interface as a sum of the weights of each of the interface method signatures that match one of the method signatures of the directly implemented methods, and instrumenting the first class if the class score for the first class is greater than a threshold.

According to another example implementation, a computer system is provided that includes instructions recorded on a computer-readable storage medium and readable by at least one processor. The system includes receiving logic configured to receive a first class, the first class indirectly implementing a first interface, wherein the first class extends a second class that directly implements the first interface, identifying logic configured to identify one or more directly implemented methods within the first class, method signature determining logic configured to determine a method signature for one or more of the directly implemented methods, estimating logic configured to estimate that the first class indirectly implements the first interface based on the method signatures for the one or more directly implemented methods, and instrumenting logic configured to instrument the first class based on the estimating that the first class indirectly implements the first interface.

The details of one or more implementations are set forth in the accompanying drawings and the description below. Other features will be apparent from the description and drawings, and from the claims.

BRIEF DESCRIPTION OF THE DRAWINGS

FIG. 5 is a diagram illustrating an interface according to an example implementation.

FIG. 6 is a diagram illustrating an example class that implements the example interface illustrated in FIG. 5.

FIG. 7 is a diagram illustrating a class 700 that extends the class 600 shown in FIG. 6.

DETAILED DESCRIPTION

Figure 1:
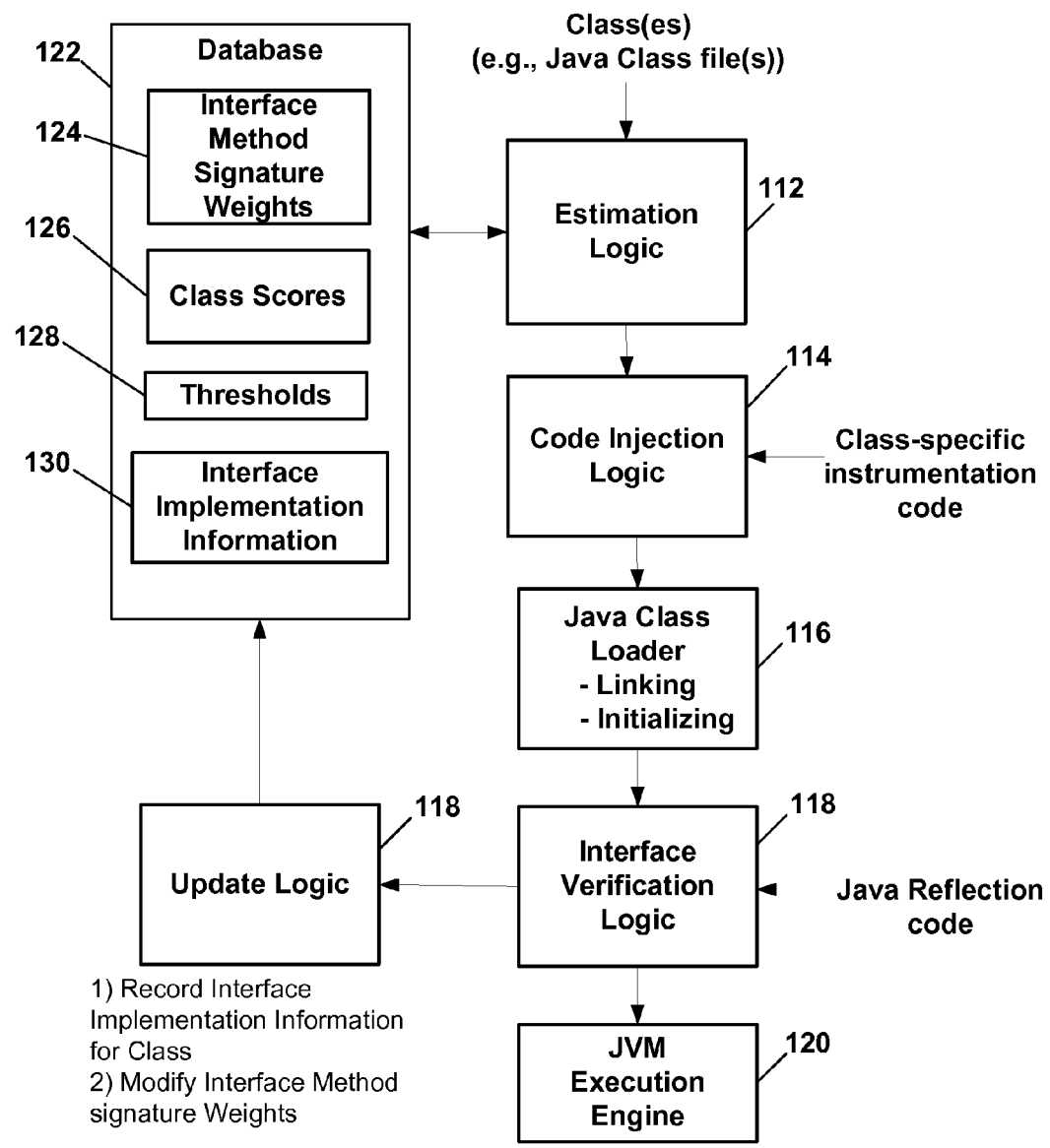
FIG. 1 is a block diagram of an exemplary system 100 for estimating whether a class likely indirectly implements an interface based on directly implemented methods.

According to an example implementation, a technique is provided to determine or at least estimate whether or not a Java class (or Java class file) indirectly implements an interface based on one or more methods that are directly implemented by the class.

Each Java class (or class file) includes byte-code that may be executed by a Java Virtual Machine (JVM). Each class may include a declaration or statement indicating that the class implements an interface. An interface may provide method names and parameters for each method that must be implemented in order for a class to provide or implement the interface. Thus, the interface defines the method names and parameters for a set of methods that make up the interface. The logic or code for each method of the interface is not provided as part of the interface, but is left to the class to provide specific logic for each interface method.

For example, the following Java statement indicates that an interface "DatabaseI" is implemented by a class:

```
public interface DatabaseI {
    establishconnection (string, url)
    executequery (string sql)
    close ( ) ; {
```

In this example, the interface "DatabaseI" includes three methods that are defined, where the method name and the parameters are defined for each method of the interface. However, in the interface, the logic is not defined for each method of the interface, but is left to each class to implement or define specific logic for each method of the interface. In this example, the interface defines three methods: "establishconnection", "executequery", and "close." The method "establishconnection" includes one parameter (url) of type string; the method executequery includes one parameter (sql) of type string; and the method "close" includes no parameters. However, each method may include any number of parameters, and each parameter may be one type of a plurality of different types (e.g., string, Boolean, character, . . . ).

Also, each method may have a method signature. As examples, a method signature may include a method name, or may include a method name and a number, type and order of the method's parameters. For example, the method signature for the interface method "establish" connection included in the interface "DatabaseI" includes the method name "establishconnection" and the one parameter of type string. This is merely one example method signature, and other methods will have other method signatures.

Each class may also include a statement or declaration indicating that the class (directly) implements an interface. The class would indicate that the interface is implemented, followed by the method name, parameters and logic for each directly implemented method of the interface. Thus, in the following example, class B directly implements one or more methods of interface "DatabaseI" by including the interface name, as well as the interface method name, parameters and the code or logic for such interface method(s) directly within the class. For example, the following statements indicate that class B directly implements the interface "DatabaseI" and methods for such interface, including the "establishconnection" method:

```
public class B implements DatbaseI {...
public void establishconnection (string url)
//logic for executing the establish connection method/function...}
```

The specific logic is not shown for this method, but it is noted after the // characters where such logic/code would be provided in this example to perform such method. Other methods and their associated logic would also be listed in this class for the interface DatabaseI.

Each Java class may also include a statement or declaration indicating that the class extends another class. Java, like other object-oriented languages, supports class inheritance. Inheritance allows one class to inherit the properties and objects of another class, such as the methods or interfaces implemented by the class that is extended.

For example, the following Java statement indicates that class A extends class B. "public class A extends B . . . " As a result of class A extending class B, the methods implemented by class B are accessible by class A, for example. Also, any interfaces implemented by class B are accessible by class A. In other words, when class A extends class B, class A indirectly implements any interfaces that are directly implemented by class B, and class A also indirectly implements any methods that are directly implemented by class B.

According to an example implementation, it may be desirable to instrument one or more classes, such as to instrument one or more interface methods implemented by a class. Instrumenting a Java class may generally involve modifying or manipulating byte code of a class, such as by inserting additional byte code into the class, e.g., in order to obtain information regarding the execution of such methods or class, including viewing execution results, viewing parameter contents, identifying any errors or exceptions generated by execution of such a method or class, etc.

According to an example implementation, instrumenting may be performed by injecting instrumentation (instrumenting) code into a class or classes. For example, Java includes a Java instrumentation mechanism that allows Java agents to be provided that can inspect byte code of classes. Thus, Java Instrumentation, which includes a package of classes to inject byte code or otherwise view or inspect class byte code, may be used to modify byte code of classes, e.g., to add entry and exit logging code to methods of classes. Also, Java Instrumentation does not allow modifying of class schema (e.g., adding/removing methods and data members) after a class has been loaded. Java Reflection may also be used after classes are loaded to determine which interfaces are indirectly implemented by a class, but this may result in classes being loaded out of order. Also, this may be too late for changing a class's schema or for applying logic before any of a class's methods are executed.

According to an example implementation, it is desirable to instrument a class, e.g., inject byte code (such as interface-specific byte code) into one or more classes before such class(es) are loaded, if the class either directly or indirectly implements one or more interfaces. For example, byte code of the class (to be instrumented) may be directly inspected prior to loading of the class to determine if the class directly implements an interface since, if an interface is directly implemented, the statements in the byte code of the class will identify the interface and list the associated interface methods and associated logic of each interface method. In some example implementations, source code, at least in some cases, of a class may be similarly inspected to determine if the class directly implements an interface.

However, it is far more difficult to ascertain, from an inspection of a class, whether the class indirectly implements an interface, since such interface and associated methods are not necessarily listed in the class byte code. For example, as noted above, if class A extends class B, and class B implements interface "DatabaseI", the byte code of class A will not necessarily list the interface or its methods. This interface and the interface methods are listed in class B source code, but source code of class B may not be available to inspect. Also, this interface and the interface methods may be listed in class B byte code, but byte code of class B may not be available to inspect. Thus, merely examining class A may not indicate whether or not class A implements the interface implemented by class B.

However, according to an example implementation, classes that indirectly implement an interface (e.g., extend a class that implements the interface) typically also directly implement one or more local or direct versions of the interface methods. For example, if class A extends B, and class B implements interface DatabaseI, this means that class A indirectly implements interface DatabaseI. In such case, it would be common, at least in some cases, for class A to list or include local or directly implement a version of one or more of the interface methods of the DatabaseI interface, such as, for example, directly implement the method by the name "establishconnection."

Therefore, according to an example implementation, a comparison of a method signature of one or more methods that are directly implemented in a class to one or more method signatures of an interface (interface method signatures) may be used to determine or estimate whether the class (likely) indirectly implements such interface. A match between a method signature of one or more directly implemented methods within a class to one or more interface method signatures may, at least in some cases, indicate that the class likely indirectly implements such interface. As noted, the class may typically directly implement one or more methods having the same method signature as the interface methods if that class indirectly implements such interface. However, this may be only an estimate since such directly implemented methods of the class may have the same method signature as an interface method, but the class may or may not indirectly implement such interface. Thus, after class A has been instrumented, e.g., by injecting interface-specific instrumenting byte code, and classes A and B (and possibly others) have been loaded, it may be verified that class A does in fact indirectly implement the interface, by inspecting class B after it has been loaded, for example. This verification may be done, for example, by using Java Reflection.

Therefore, according to an example implementation, the method signatures of interface methods and method signatures of methods directly implemented by a class may be used to determine or estimate whether the class likely indirectly implements the interface. According to one example implementation, a technique may be provided that includes determining a method signature for each of a plurality of interface methods, assigning a weight to each of the plurality of interface method signatures based on a number of occurrences of the associated interface method signature within a group of classes and interfaces, receiving a first class, the first class indirectly implementing a first interface, wherein the first class extends a second class that directly implements the first interface. The technique may also include identifying one or more methods that are directly implemented within the first class, determining a method signature for each of the one or more directly implemented methods within the first class, comparing the method signature for the one or more directly implemented methods to the method signatures of the interface methods, identifying one or more of the directly implemented methods having a method signature that matches one of the interface method signatures, determining a class score for the first class with respect to the first interface as a sum of the weights of each of the interface method signatures that match one of the method signatures of the directly implemented methods, and instrumenting the first class if the class score for the first class is greater than a threshold.

FIG. 1 is a block diagram of an exemplary system 100 for estimating whether a class likely indirectly implements an interface based on directly implemented methods. System 100 includes a database 122 that may store interface method weights 124, class scores 126, thresholds 128 and interface implementation information 130. Interface method signature weights 124 may store weights assigned to each of a plurality of interface method signatures (method signatures for each method of one or more interfaces). Class scores 126 may store a score assigned to each class with respect to an interface that, for example, indicates or is associated with a likelihood that the class indirectly implements the associated interface. According to an example implementation, a higher score may indicate a higher likelihood or higher probability that the class indirectly implements the interface. According to an example implementation, if a class score with respect to an interface exceeds a threshold (e.g., a threshold for the interface) then it may be assumed that the class indirectly implements or likely indirectly implements the interface. After one or more classes are loaded, Java Reflection or other tool may be used to confirm whether or not the class actually indirectly implements the interface, e.g., by inspecting the one or more classes. Interface implementation information 130 may then be updated to indicate whether or not the class indirectly implements the interface, so that in the future, when the class is received again, interface implementation information 130 may be accessed to quickly determine if the class indirectly implements the interface.

According to an example implementation, a method weight may be assigned to each of one or more interface method signatures. The weights assigned to the interface method signatures may be stored in method signature weights 124. In an example implementation, a method signature weight may be assigned to each of one or more interface method signatures based on the uniqueness of the interface method signature within a group of classes or interfaces. For example, the uniqueness of an interface method signature (within a group of methods, or within a group of classes or interfaces that include one or more methods) may be measured by a number of occurrences of the interface method signature within the group.

For example, a weight assigned to an interface method signature may be related to the uniqueness of the signature (e.g., higher weight for a more unique or less common signature). Or, for example, the weight assigned to the interface method signature may be inversely related to the number of occurrences of the interface method signature within the group (a group of interfaces or classes). Any method may be used to select the group of classes or interfaces, such a identifying or compiling a list of available or known classes or interfaces. Or the group may simply include one or more known classes and interfaces. A method signature may be determined for one or more of the interface methods, and then a weight may be assigned to each interface method signature, e.g., based on the number of occurrences for the method signature within the group. Thus, a number of occurrences for each interface method signature within the group may be determined for each (or one or more) method signatures.

For example, a relatively high weight (e.g., 100) may be assigned to an interface method signature that occurs only once or twice within a group. Thus, the higher weight assigned to the interface method signature may indicate a much higher probability that the class that includes a directly implemented method having a method signature matching such interface method signature is very likely to indirectly implement such interface. On the other hand, a relatively low weight (e.g., 0, 10 or 20) may be assigned to an interface method signature that appears or occurs a much higher number of times (e.g., 15, 10 or 5 times, respectively), within a group that includes 50-75 interfaces, as an example. As another example, an interface method signature that only appears in the interface of interest, and does not appear any other times within the group, may be assigned the maximum weight, e.g., 100, which in one example implementation such maximum weight may be the same value as the threshold used for such interface. Thus, a larger number of occurrences of an interface method signature within the group means that the presence of such interface method signature directly within a class is not as probative or predictive in terms of estimating whether such class indirectly implements such interface, e.g., since such interface method signature may be associated with or included in many other interfaces or classes. Thus, a lower weight may be assigned to such method signatures. On the hand, an interface method signature having fewer (e.g., 1, 2, 3, . . . ) occurrences within the group may be more valuable in terms of predicting that the class indirectly implements the interface, and thus, may be assigned a higher or greater weight.

Referring again to FIG. 1, a Java class (which may be referred to as a Java class file) may be received by an estimation logic 112. According to an example implementation, the received class, e.g., class A, may extend class B. In this example, class B may implement an interface "DatabaseI." Thus, class A may indirectly implement the interface "DatabaseI." DatabaseI may include several interface methods, such as "establishconnection", "executequery", "close", etc., where each interface method may include a method signature. According to an example implementation, class A may also directly implement one or more methods, which may have the same name or same signature as one or more of the interface methods of DatabaseI. If one or more methods that are directly implemented by class A have a same method signature as one or more interface methods of DatabaseI, this may make it more likely that class A indirectly implements DatabaseI. As noted above, this is because a class that indirectly implements an interface will typically directly implement one or more methods of the interface.

Referring to FIG. 1, according to an example implementation, estimation logic 112 may estimate that a received first class, e.g., class A, indirectly implements a first interface (e.g., DatabaseI) based on method signatures for one or more directly implemented methods. According to an example implementation, estimation logic may compare the method signature for one or more directly implemented methods of the received class to one or more interface method signatures to determine if there are any matches (matches between method signatures of directly implemented methods and interface method signatures). Estimation logic 112 may then generate a class score for the received class (e.g., class A) with respect to the interface (e.g., DatabaseI) as a sum of the weights of each of the matching interface method signatures (e.g., sum of weights of the interface method signatures that match one of the method signatures of directly implemented methods). This class score with respect to the interface (e.g., class score for class A with respect to DatabaseI), as a sum of the weights, may represent or may reflect, for example, a cumulative or total likelihood or total probability that the received class (e.g., class A) indirectly implements the interface. The class score in this example may, therefore, represent or indicate the likelihood that class A implements interface "DatabaseI". Estimation logic 112 may compare the class score for the received class to a threshold (e.g., a threshold for the interface). According to an example implementation, if the class score is greater than the threshold, this indicates that the class likely indirectly implements the interface.

For example, the class score with respect to an interface may be determined as a sum of weights: 10, 100 and 30, for a class score of 140, based on the presence of three signatures of three directly implemented methods that match interface method signatures of the interface. Estimation logic 112 may then compare the class score of 140 to the threshold (100) for this interface. Because the score (140) is greater than the threshold (100), this indicates that the received class likely implements the interface.

According to an example implementation, code injection logic 114 may instrument the received class (e.g., class A) if estimation logic 112 determines or estimates that the received class (e.g., class A) likely indirectly implements the interface. Instrumenting the received class may involve, for example, code injection logic 114 injecting interface-specific instrumentation code into the byte-code of the received class before such received class is loaded. The interface-specific instrumentation code may include code specifically designed to test or monitor the operation of one or more methods of the interface that are directly implemented by the received class, e.g., by injecting byte-code that may cause the operation of the method(s) of the interface to be viewed, monitored or tested. For example, instrumenting the class may allow input parameters to be viewed, output or logged both before and after execution of one or more methods of the interface that are directly implemented in the class, to cause any errors or exceptions or other conditions generated by the methods to be viewed, output or logged, etc. This is merely one example of instrumenting, and instrumenting may generally involve modifying or manipulating the byte-code of the class.

After code injection or instrumenting the received class is performed by code injection logic 114, Java class loader 116 may load one or more classes, including the instrumented (or manipulated) class and other classes. For example, both class A (the received class that is instrumented) and class B (the class that directly implements the interface DatabaseI) may be loaded, along with any additional classes.

According to an example implementation, class loading may include physically loading, linking and initializing one or more classes. Physically loading may involve, for example, searching one or more provided class paths, and loading the byte-code for the Java class into memory. Linking may include, for example, byte-code verification which includes performing a number of checks on the byte-code, class preparation where necessary data structures are prepared that represent fields, methods and implemented interfaces that are defined within the class, and resolving of other classes referenced by the class. Initializing may include executing static initializers contained within the class so that static fields are initialized to their default values. This is merely one example description of class loading, and other types or variations of class loading may be performed.

After the class has been loaded, interface verification logic 118 may verify that the interface that was estimated to be indirectly implemented by the class was actually indirectly implemented by the class. Verification may be performed, for example, by inspecting the superclass that directly implements the interface. Java virtual machine (JVM) execution engine 120 then executes the byte-code of the loaded classes.

According to an example, where class A extends class B (e.g., class B is a superclass to class A), the estimation logic 112 may have estimated that class A indirectly implements the interface "DatabaseI", e.g., based on method weights for one or more methods that are directly implemented by class A and a class score calculated for class A with respect to the interface DatabaseI as compared to a threshold. After both class A and class B have been loaded by Java class loader 116, Java Reflection code may be used by interface verification logic 118 to inspect class B to determine which interfaces are directly implemented by class B. For example, the byte-code for class B may be inspected based on Java Reflection code to identify the interface name of "DatabaseI" within class B in order to confirm or verify that class B directly implements interface "DatabaseI."

After it is verified whether or not the estimated interface (e.g., "DatabaseI" in the example) was actually indirectly implemented by the class (e.g., class A), information may be stored by verification logic 118 in interface implementation information 130 of database 122 that indicates whether or not the subject class (e.g., class A) indirectly implements the interface, and/or indicates whether or not the superclass or extended class (e.g., class B) directly implements the interface. According to an example implementation, this interface implementation information may be used by estimation logic 112 in the future when the same class (e.g., class A) is received by system 110 or estimation logic 112 to determine whether the class (e.g., class A) indirectly implements the interface (e.g., DatabaseI), without estimation logic 112 performing the estimating (determining method signatures for directly implemented methods of class A, determining a class score, comparing the class score to the threshold, etc.). According to an example implementation, this estimating procedure performed by estimation logic 112 may be unnecessary, at least in some cases, where interface implementation information 130 within database 122 already indicates whether or not such interface is indirectly implemented by class A.

According to an example implementation, upon a second or subsequent receipt of a class (e.g., class A), if interface implementation information 130 indicates that the received class (e.g., class A) does not indirectly implement an interface (e.g., "DatabaseI"), then the estimating procedure performed by estimation logic 112 may be skipped, and code injection logic 114 does not instrument the class (e.g., class A) with interface-specific instrumentation code for the interface, since it is known that such interface is not indirectly implemented by the class. Java class loader 116 may then load one or more classes, including class A, in this example, but interface verification logic does not necessarily verify that class A indirectly implements the interface, since this information is already known and stored in interface implementation information 130. JVM execution engine 120 then executes the code-byte of the loaded classes.

On the other hand, according to an example implementation, upon a second or subsequent receipt of a class (e.g., class A), if interface implementation information 130 indicates that the received class (e.g., class A) does indirectly implement an interface (e.g., "DatabaseI"), then the estimating procedure performed by estimation logic 112 may be skipped, and code injection logic 114 may instrument the class (e.g., class A) with interface-specific instrumentation code for the interface. Java class loader 116 may then load one or more classes, including class A, in this example, but interface verification logic 118 does not necessarily verify that class A indirectly implements the interface, since this information is already known and stored in interface implementation information 130, according to an example implementation. JVM execution engine 120 then executes the code-byte of the loaded classes.

According to an example implementation, the following may be performed if estimation logic 112 estimates that the class (e.g., class A) indirectly implements an interface (e.g., DatabaseI), e.g., estimation logic 112 determines that the class score for class A with respect to the interface "DatabaseI" is greater than the threshold for the DatabaseI interface: verify (by interface verification logic 118) that the class (e.g., class A) actually indirectly implements the interface, record information (e.g., by interface verification logic 118) within interface implementation information 130 indicating that the class (e.g., class A) implements the interface, receive (e.g., by system 110 or estimation logic 112) the class (e.g., class A) a second or subsequent time, determine that the class (e.g., class A) indirectly implements the interface (e.g., DatabaseI) based on the recorded information stored or recorded in interface implementation information 130, and directly instrument (e.g., by code injection logic 114) the class (e.g., class A), by injecting byte-code into the first class that are specific to the interface (e.g., DatabaseI) or specific to the class (e.g., class A), without necessarily performing the estimating, e.g., comparing or calculating a class score a second time for the class with respect to the interface.

According to an example implementation, the verification information determined by interface verification logic 118 may be used, at least in some cases, to adjust or modify one or more interface method weights, e.g., such as in the case where the estimation is incorrect. For example, as noted, estimation logic 112 may estimate whether or not a class indirectly implements an interface. This estimation may be performed, for example, by comparing a method signature of one or more directly implemented methods to interface method signatures. A class score may be calculated for the class with respect to the interface as a sum of weights of interface method signatures that match method signatures of directly implemented methods. As noted, a weight may be assigned to one or more interface method signatures, e.g., based on a uniqueness of the interface method signature within a group such as based on a number of occurrences of the interface method signature within a group of classes and/or interfaces. Each class or interface within the group may list or include one or more methods. For example, the more unique a method signature, or the fewer occurrences of the method signature within the group, then a higher weight may be assigned to the interface method signature, for example.

If estimation logic 112 estimates that a class (e.g., class A) indirectly implements an interface, but it turns out the such class does not indirectly implement the interface (e.g., based on verification information provided by interface verification logic 118), then one or more interface method weights (e.g., non-zero weights) that contributed to the class score for such class may be decreased or decremented. For example, if two matching interface method weights (30 and 90) contributed to the class score of 120 (where estimation logic 112 estimated that the interface is indirectly implemented by the class based on the class score of 120 being >100), these interface method weights (30, 90) may be decreased 10% to 27 and 81, respectively, in the event that the estimation was incorrect. This is merely one example illustrating how method weights may be adjusted, and many other techniques may be used to adjust method weights.

According to one example, using Java Reflection, after class A and the class B have been loaded (where class B is the superclass to class A, or in other words, class A extends class B), interface verification logic 118 may determine that, although the class score for class A with respect to an interface is greater than a threshold, class A does not indirectly implement the interface. Therefore, the estimation was incorrect, in this example. In addition, Java Reflection may be used by interface verification logic 118 to determine which of the interface method signatures that match one of the methods of the directly implemented methods were not indirectly implemented by the first class. Interface verification logic 118 may then decrease or decrement a weight assigned to one or more of the method signatures of the interface that was not directly implemented, and/or interface verification logic 118 may decrease or decrement a weight of one or more interface methods that were not indirectly implemented by the first class.

Similarly, if the estimation logic 112 estimated that a class (e.g., class A) did not indirectly implement an interface, but the verification performed by interface verification logic 118 indicates that class A did in fact indirectly implement the interface, then interface verification logic 118 may increase (e.g., increase by 10%) the weights for one or more (or even all) of the interface method weights of the interface. In this manner, a feedback mechanism may be provided to adjust the interface method weights to provide a more reliable interface estimation by estimation logic 112, for example.

Figure 2:
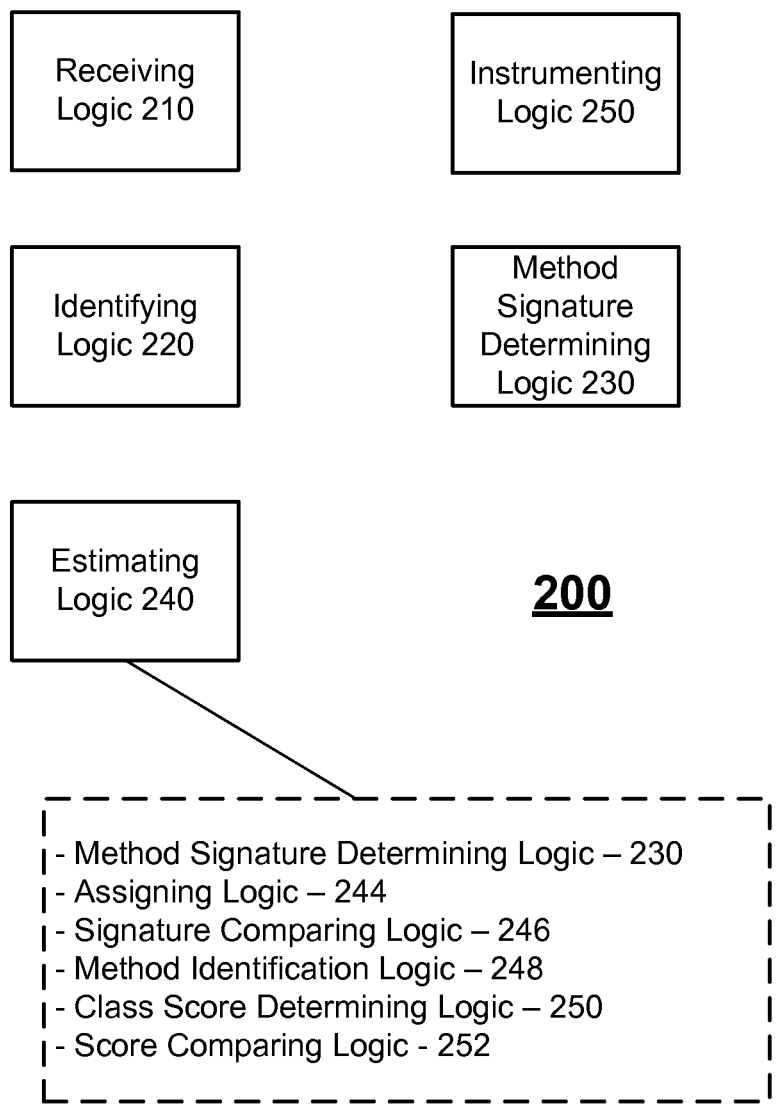
FIG. 2 is a block diagram of a system according to an example implementation.

FIG. 2 is a block diagram of a system according to an example implementation. System 200 includes a receiving logic 210 configured to receive a first class, the first class indirectly implementing a first interface, wherein the first class extends a second class that directly implements the first interface, an identifying logic 220 configured to identify one or more directly implemented methods within the first class, a method signature determining logic 230 configured to determine a method signature for one or more of the directly implemented methods, an estimating logic 240 configured to estimate that the first class indirectly implements the first interface based on the method signatures for the one or more directly implemented methods, and instrumenting logic 250 configured to instrument the first class based on the estimating that the first class indirectly implements the first interface.

According to an example implementation, the estimating logic 240 may include method signature determining logic 230 further configured to determine a method signature for each of a plurality of interface methods, assigning logic 244 configured to assign a weight to each of the plurality of interface method signatures of the first interface based on a number of occurrences of the associated interface method signature within a group of classes and interfaces, signature comparing logic 246 configured to compare the method signature for the one or more directly implemented methods to the method signatures of the interface methods, method identification logic 248 configured to identify one or more of the directly implemented methods having a method signature that matches one of the interface method signatures, class score determining logic 250 configured to determine a class score for the first class with respect to the first interface as a sum of the weights of each of the interface method signatures that match one of the method signatures of the directly implemented methods, and score comparing logic 252 configured to compare the class score to a threshold. And, the score comparing logic 252 further configured to determine that the class score is greater than the threshold.

Figure 3:
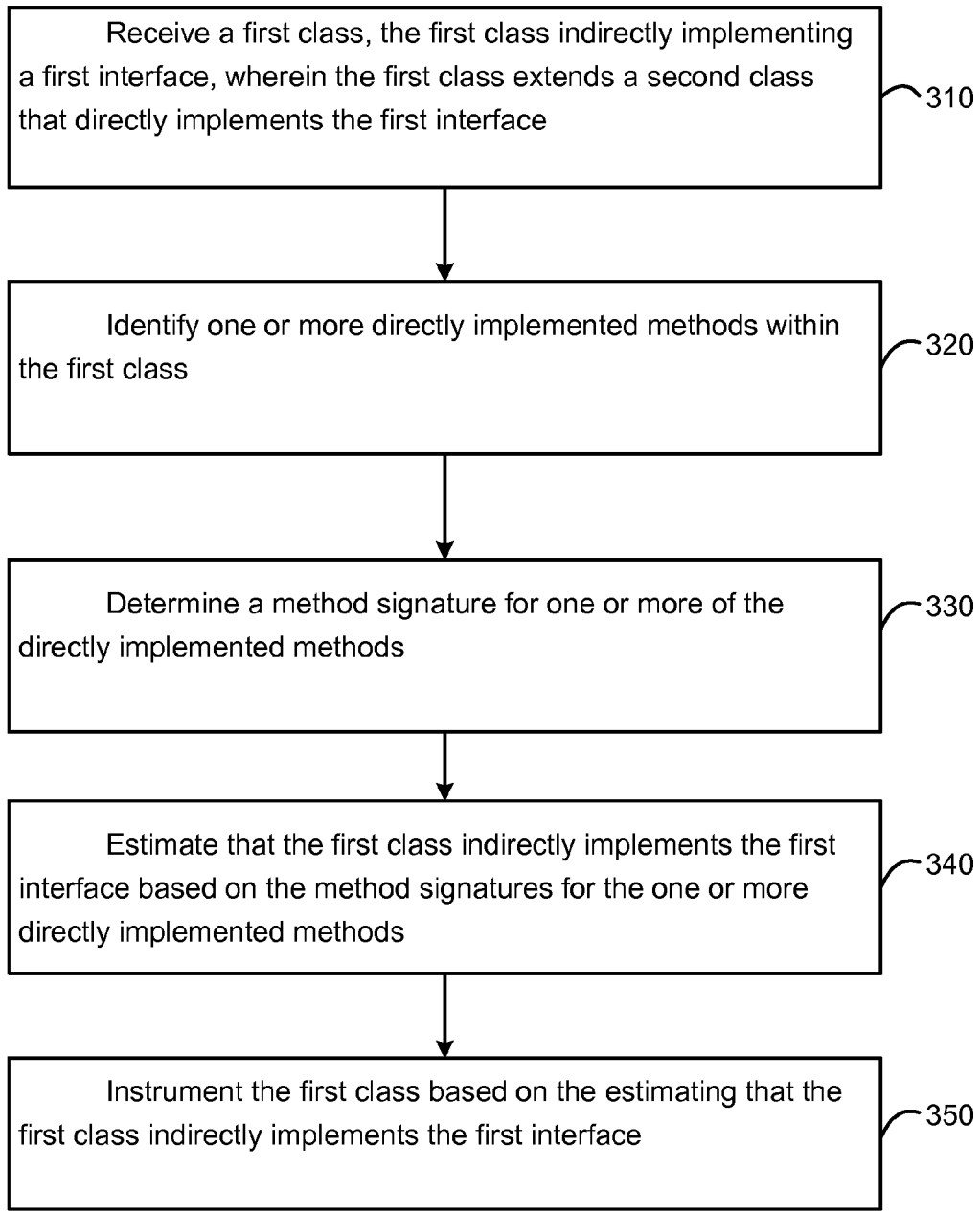
FIG. 3 is a flow chart illustrating operation of a system according to an example implementation.

FIG. 3 is a flow chart illustrating operation of a system according to an example implementation. At 310, a first class (e.g., class A) is received, the first class indirectly implementing a first interface, wherein the first class extends a second class (e.g., class B) that directly implements the first interface. At 320, one or more directly implemented methods are identified within the first class. At 330, a method signature is determined for one or more of the directly implemented methods. At 340, it is estimated that the first class indirectly implements the first interface based on the method signatures for the one or more directly implemented methods. At 350, the first class is instrumented based on the estimating that the first class indirectly implements the first interface.

In an example implementation the estimation operation 340 may include determining a method signature for each of a plurality of interface methods, assigning a weight to each of the plurality of interface method signatures of the first interface based on a number of occurrences of the associated interface method signature within a group of classes and interfaces, comparing the method signature for the one or more directly implemented methods to the method signatures of the interface methods, identifying one or more of the directly implemented methods having a method signature that matches one of the interface method signatures, determining a class score for the first class with respect to the first interface as a sum of the weights of each of the interface method signatures that match one of the method signatures of the directly implemented methods, comparing the class score to a threshold, and determining that the class score is greater than the threshold.

In an example implementation, the instrumenting operation 350 may include instrumenting the first class based on the class score being greater than the threshold. The instrumenting may include injecting into byte-code of the first class additional byte code specific to the first interface to view or monitor the performance of one or more of the directly implemented methods of the first class.

Figure 4:
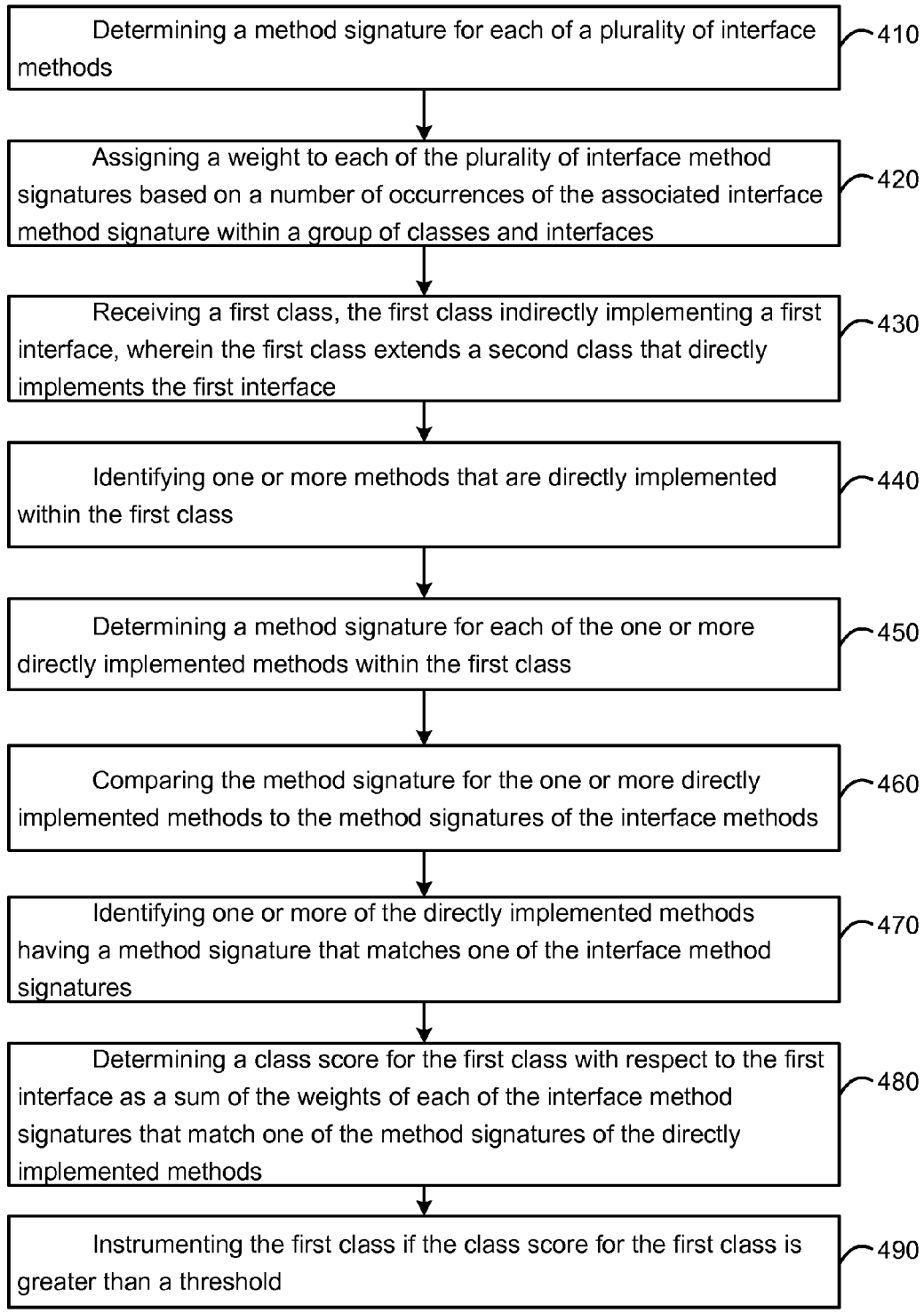
FIG. 4 is a flow chart illustrating operation of a system according to another example implementation.

FIG. 4 is a flow chart illustrating operation of a system according to another example implementation. At 410, a method signature is determined for each of a plurality of interface methods. At 420, a weight is assigned to each of the plurality of interface method signatures based on a number of occurrences of the associated interface method signature within a group of classes and interfaces. At 430, receiving a first class is received, wherein the first class indirectly implements a first interface, wherein the first class extends a second class that directly implements the first interface. At 440, one or more methods are identified that are directly implemented within the first class. At 450, a method signature is determined for each of the one or more directly implemented methods within the first class. At 460, the method signature for the one or more directly implemented methods is compared to the method signatures of the interface methods. At 470, one or more of the directly implemented methods having a method signature are identified that match one of the interface method signatures. At 480, a class score for the first class with respect to the first interface is determined as a sum of the weights of each of the interface method signatures that match one of the method signatures of the directly implemented methods. At 490, the first class is instrumented if the class score for the first class is greater than a threshold.

An example will be briefly described with reference to FIGS. 5-7. FIG. 5 is a diagram illustrating an interface according to an example implementation. Interface 500 includes a statement 510 which identifies the name of the interface 500 as "DatabaseI". DatabaseI may be an interface related to some basic database services, for example. DatabaseI includes or identifies several methods that are part of the interface. Statement 512 indicates that a method "establishConnection" is provided that includes two parameters, including a first parameter (url) of type string, and a second parameter (info) of type Properties. A method signature for the establish connection method may include the method name (establishConnection), and the number, order and type of parameters for the method. In this example, the method signature for the establishConnection method may include, for example, the method name (establishConnection) and the type and order of the parameters, including a first parameter of type String, a second parameter of type Properties. Other methods are included or defined in the DatabaseI interface, including an executeQuery method 514, a commit method 516, a rollback method 518, and a close method 520. Interface 500 is merely an illustrative or example interface with some example methods, but any interface may be provided.

FIG. 6 is a diagram illustrating an example class that implements the DatabaseI interface illustrated in FIG. 5. Statement 610 in FIG. 6 identifies a name of the class as "DefaultDBImpl", and indicates that such class "implements DatabaseI . . . ." Also, the class DefaultDBImpl 600 identifies the methods and logic for each of the methods of the DatabaseI interface. As shown in FIG. 6, the method establishConnection 611 is defined, and includes default logic 612 for such method. The actual logic that would be provided for the method 611 is not shown, but indicates where such logic would be provided or found for this method of the interface. Similarly, the methods executeQuery 614, commit 616, rollback 618 and void 620 are provided including logic (or locations where logic would be provided) for each method. Therefore, as shown in FIG. 6, the class DefaultDBImpl 600 directly implements the DatabaseI interface.

FIG. 7 is a diagram illustrating a class 700 that extends the class 600 shown in FIG. 6. As shown in FIG. 7, statement 710 within the class 700 states that the class "ZippedDBImpl" 700 extends the class DefaultDBImpl 600. Thus, the class DefaultDBImpl 600 may be considered an extended class or a superclass with respect to the class ZippedDBImpl 700. As noted above with reference to FIG. 6, the class DefaultDBImpl 600 directly implements the interface DatabaseI 500. As a result, the class ZippedDBImpl 700 indirectly implements the interface DatabaseI 500. Prior to loading, according to one example implementation, the source code of the class ZippedDBImpl 700 may be known or accessible (thus it may typically be known, based on an inspection of source code of class 700, that class 700 extends class 600). However, in this example, the source code for class DefaultDBImpl 600 may not be accessible. As a result, it may not be known whether or not class ZippedDBImpl 700 indirectly implements interface DatabaseI 500, for example. Therefore, estimation logic 112 (FIG. 1) may estimate whether or not class ZippedDBImpl 700 indirectly implements interface DatabaseI 500 based on one or more methods that are directly implemented by class ZippedDBImpl 700.

Therefore, the following may be performed according to an example implementation. A method signature may be determined for each of a plurality of interface method signatures, such as for interface method signatures associated with methods 512, 514, 516, 518 and 520. A weight may be assigned to each of the plurality of interface method signatures based on a number of occurrences of the associated interface method signature within a group of classes and interfaces. For example, it may be determined that the method executeQuery 514 occurs once within a group of classes or interfaces, and therefore, may be assigned a relatively high value as a weight, e.g., 90 or 100, where 100 may be a threshold. On the other hand, the method close 520 may be very common and show up or occur in 25 or 30 interfaces out of 75 interfaces in a group of other interfaces, and therefore, may be assigned a low weight, e.g., 0 or 5.

The class ZippedDBImpl 700 may be received that indirectly implements the class DefaultDBImpl 600. One or more methods that are directly implemented within class ZippedDBImpl 700 are identified, and a method signature may be determined for each directly implemented method. These method signatures of the directly implemented methods may be compared to one or more of the interface method signatures, and one or more matches may be identified. A class score for the class ZippedDBImpl 700 may be determined with respect to the interface DatabaseI 500, e.g., as a sum of the weights of each of the matching interface method signatures. The class ZippedDBImpl 700 may be instrumented if the class score for the class ZippedDBImpl 700 is greater than a threshold. For example, a class score greater than the threshold may indicate that the class ZippedDBImpl 700 likely indirectly implements the interface DatabaseI 500, in this example. In such case, it may be desirable to instrument such class ZippedDBImpl 700 to view or test or monitor one or more of the directly implemented methods 712, 714, 716 (e.g., which may implement methods of the interface 500). This is merely one illustrative example, and other classes, interfaces and methods, etc. may be used in other examples.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium comprising computer-readable instructions stored thereon that, when executed, are configured to cause a processor to at least:
   receive a first class, the first class indirectly implementing a first interface, wherein the first class extends a second class that directly implements the first interface;
   identify one or more directly implemented methods within the first class;
   determine a method signature for one or more of the directly implemented methods, each method signature including a method name and one or more method parameters for a method;
   estimate that the first class indirectly implements the first interface based on the method signatures for the one or more directly implemented methods; including:
      compare the method signature for each of the one or more directly implemented methods to the method signatures of the interface methods; and
      identify one or more of the directly implemented methods having a method signature that matches one of the interface method signatures; and
   instrument the first class based on the estimating that the first class indirectly implements the first interface.

2. The computer-readable storage medium of claim 1 wherein the instructions configured to cause the processor to estimate comprise instructions, when executed, are further configured to cause the processor to at least:
   assign a weight to each of the plurality of interface method signatures of the first interface based on a number of occurrences of the associated interface method signature within a group of classes and interfaces;
   determine a class score for the first class with respect to the first interface as a sum of the weights of each of the interface method signatures that match one of the method signatures of the directly implemented methods;
   compare the class score to a threshold; and
   determine that the class score is greater than the threshold.

3. The computer-readable storage medium of claim 1 wherein the method signature includes a method name and a number and type of the method's parameters.

4. The computer-readable storage medium of claim 2 wherein the instructions configured to cause the processor to assign a weight comprise instructions, when executed, are configured to cause the processor to:
   determine a number of occurrences of the interface method signature within a group that includes at least one class or interface other than the first class, wherein one or more of the classes implements one or more interfaces; and
   assign a weight to the interface method signature, wherein the weight assigned to the interface method signature is inversely related to the number of occurrences of the interface method signature within the group.

5. The computer-readable storage medium of claim 1 wherein the first class includes byte-code, wherein the instructions configured to cause the processor to instrument the first class comprise instructions, when executed, are configured to cause the processor to inject additional byte-code into the first class in order to record or monitor an execution of the first class.

6. A computer implemented method performed by a processor comprising:
   receiving a first class, the first class indirectly implementing a first interface, wherein the first class extends a second class that directly implements the first interface;
   identifying one or more directly implemented methods within the first class,
   determining a method signature for one or more of the directly implemented methods, each method signature including a method name and one or more method parameters for a method;
   estimating that the first class indirectly implements the first interface based on the method signatures for the one or more directly implemented methods, including:
      comparing the method signature for each of the one or more directly implemented methods to the method signatures of the interface methods; and
      identifying one or more of the directly implemented methods having a method signature that matches one of the interface method signatures;
   instrumenting the first class based on the estimating that the first class indirectly implements the first interface.

7. The computer implemented method of claim 6 wherein the estimating further comprises:
   assigning a weight to each of the plurality of interface method signatures of the first interface based on a number of occurrences of the associated interface method signature within a group of classes and interfaces;
   determining a class score for the first class with respect to the first interface as a sum of the weights of each of the interface method signatures that match one of the method signatures of the directly implemented methods;
   comparing the class score to a threshold; and
   determining that the class score is greater than the threshold.

8. The computer implemented method of claim 7 wherein the instrumenting comprises instrumenting the first class based on the class score being greater than the threshold, the instrumenting comprises injecting into byte-code of the first class additional byte code specific to the first interface to view or monitor the performance of one or more of the directly implemented methods of the first class.

9. The computer implemented method of claim 6 and further comprising
   determining a method signature, based on at least a method title, for each interface method of a group of methods; and
   assigning a weight to each of the plurality of interface method signatures based on a frequency of occurrence of the interface method signature within a group of methods.

10. A computer implemented method performed by a processor, the computer implemented method comprising:
    determining a method signature for each of a plurality of interface methods;
    assigning a weight to each of the plurality of interface method signatures based on a number of occurrences of the associated interface method signature within a group of classes and interfaces;
    receiving a first class, the first class indirectly implementing a first interface, wherein the first class extends a second class that directly implements the first interface;

identifying one or more methods that are directly implemented within the first class;

determining a method signature for each of the one or more directly implemented methods within the first class, each method signature including on a method name and one or more method parameters for a method;

comparing the method signature for each of the one or more directly implemented methods to the method signatures of the interface methods;

identifying one or more of the directly implemented methods having a method signature that matches one of the interface method signatures;

determining a class score for the first class with respect to the first interface as a sum of the weights of each of the interface method signatures that match one of the method signatures of the directly implemented methods;

instrumenting the first class if the class score for the first class is greater than a threshold.

11. The computer implemented method of claim 10 wherein the method signature includes a method name and a number and type of the method's parameters.

12. The computer implemented method of claim 10 wherein the method signature includes a method name and a number, type and order of the method's parameters.

13. The computer implemented method of claim 10 wherein the assigning a weight to an interface method signature comprises:

determining a number of occurrences of the interface method signature within a group that includes at least one class or interface other than the first class, wherein one or more of the classes implements one or more interfaces; and assigning a weight to the interface method signature, wherein the weight assigned to the interface method signature is inversely related to the number of occurrences of the interface method signature within the group.

14. The computer implemented method of claim 10 wherein the first class includes byte-code, wherein the instrumenting the first class comprises injecting additional byte-code into the first class in order to record or monitor the execution of the first class.

15. The computer implemented method of claim 10 wherein the comparing the method signature for the one or more directly implemented methods to method signatures of the interface methods comprises comparing a method name and a number and type of parameters of the one or more directly implemented methods to a method name and a number and type of parameters of one or more of the interface methods.

16. The computer implemented method of claim 10 wherein the following is performed if the class score for the first class is greater than the threshold:

recording information indicating that the first class implements the first interface;

receiving the first class a second or subsequent time; and determining that the first class implements the first interface based on the recorded information; and directly instrumenting the first class, by injecting byte-code into the first class that are specific to the first class, without performing the comparing or calculating a score a second time for the first class.

17. The computer implemented method of claim 10 and further comprising using Java Reflection, after the first class and the second class have been loaded, to inspect the second class to verify that the first class indirectly implements the first interface.

18. The computer implemented method of claim 10 and further comprising:

using Java Reflection, after the first class and the second class have been loaded, to determine that, although the score for the first class is greater than the threshold, the first class does not indirectly implement the first interface;

using Java Reflection to determine which of the interface method signatures that match one of the methods of the directly implemented methods were not indirectly implemented by the first class; and decrement a weight assigned to one or more of the method signatures of interface methods that were not indirectly implemented by the first class.

19. A computer system including instructions recorded on a non-transitory computer-readable storage medium and readable by at least one processor, the system comprising:

receiving logic configured to receive a first class, the first class indirectly implementing a first interface, wherein the first class extends a second class that directly implements the first interface;

identifying logic configured to identify one or more directly implemented methods within the first class;

method signature determining logic configured to determine a method signature for one or more of the directly implemented methods, each method signature including a method name and one or more method parameters for a method;

estimating logic configured to estimate that the first class indirectly implements the first interface based on the method signatures for the one or more directly implemented methods, the estimating logic configured to:

compare the method signature for each of the one or more directly implemented methods to the method signatures of the interface methods; and identify one or more of the directly implemented methods having a method signature that matches one of the interface method signatures; and instrumenting logic configured to instrument the first class based on the estimating that the first class indirectly implements the first interface.

20. The computer system of claim 19 wherein the estimating logic further comprises:

assigning logic configured to assign a weight to each of the plurality of interface method signatures of the first interface based on a number of occurrences of the associated interface method signature within a group of classes and interfaces;

class score determining logic configured to determine a class score for the first class with respect to the first interface as a sum of the weights of each of the interface method signatures that match one of the method signatures of the directly implemented methods;

score comparing logic configured to compare the class score to a threshold; and the score comparing logic further configured to determine that the class score is greater than the threshold.

* * * * *

UNITED STATES PATENT AND TRADEMARK OFFICE
CERTIFICATE OF CORRECTION

PATENT NO. : 8,910,127 B2  
APPLICATION NO. : 13/623593  
DATED : December 9, 2014  
INVENTOR(S) : Shiri Semo Judelman et al.

Page 1 of 1

It is certified that error appears in the above-identified patent and that said Letters Patent is hereby corrected as shown below:

Title page, item (73), in column 1, in "Assignee", lines 1-2, delete "Peteach Tikva" and insert -- Petach Tikva --, therefor.

In the Claims

In column 15, line 27, in claim 1, delete "methods;" and insert -- methods, --, therefor.

Signed and Sealed this
Eighteenth Day of August, 2015

Michelle K. Lee
*Director of the United States Patent and Trademark Office*